United States Patent
Reichert et al.

(10) Patent No.: US 7,493,528 B1
(45) Date of Patent: Feb. 17, 2009

(54) RESOLVING CONFLICTS BETWEEN MULTIPLE AUTOMATION MANAGERS IN THE MANAGEMENT OF SOFTWARE RESOURCES USING INTENTION FLAGS

(75) Inventors: Wolfgang Reichert, Weil im Schoenbuch (DE); Volker Schoelles, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/121,055

(22) Filed: May 15, 2008

(51) Int. Cl.
G06F 11/00 (2006.01)
(52) U.S. Cl. .............................. 714/48; 714/15; 714/47; 709/223
(58) Field of Classification Search ................... 714/38, 714/47, 48, 15; 718/104; 709/223
See application file for complete search history.

(56) References Cited

U.S. PATENT DOCUMENTS

| 6,052,722 | A * | 4/2000 | Taghadoss | 709/223 |
|---|---|---|---|---|
| 6,782,440 | B2 * | 8/2004 | Miller | 710/200 |
| 7,120,680 | B1 * | 10/2006 | Higgins et al. | 709/220 |
| 7,337,222 | B1 * | 2/2008 | Du et al. | 709/223 |
| 2002/0019864 | A1 | 2/2002 | Mayer | |
| 2004/0230943 | A1 | 11/2004 | Pourheidari et al. | |
| 2004/0237042 | A1 | 11/2004 | Murray et al. | |
| 2004/0237094 | A1 * | 11/2004 | Vambenepe et al. | 719/328 |
| 2005/0071350 | A1 | 3/2005 | Artale et al. | |
| 2005/0254424 | A1 | 11/2005 | Naono et al. | |
| 2006/0026552 | A1 | 2/2006 | Mazzitelli et al. | |
| 2006/0224436 | A1 | 10/2006 | Matsumoto et al. | |
| 2007/0011331 | A1 | 1/2007 | Morimoto et al. | |
| 2007/0106798 | A1 | 5/2007 | Masumitsu et al. | |
| 2008/0021918 | A1 | 1/2008 | Rao | |
| 2008/0052719 | A1 | 2/2008 | Briscoe et al. | |

FOREIGN PATENT DOCUMENTS

WO 2007/039337 A1 4/2007

OTHER PUBLICATIONS

Jennings, N.R., et al., "Agent-Based Business Process Management", Int. Journal of Cooperative Information Systems, 5, pp. 105-130, 1996.
"An Architectural Blueprint for Autonomic Computing", IBM and Autonomic Computing, Apr. 2003.
Smith, S.F., et al., "Interactive Resource Management in the Comirem Planner", The Robotics Institute, Carnegie Mellon University, 2003.

* cited by examiner

*Primary Examiner*—Yolanda L Wilson
(74) *Attorney, Agent, or Firm*—Patents on Demand, P.A.

(57) ABSTRACT

The present invention can include an automated solution for resolving conflicts between multiple automation managers in the management of a software resource. In this solution, an automation manager can detect a change in the operating state of a software resource within a computing system. A state change indication can be automatically analyzed. The state change indication can be automatically set by the software resource in response to the change in the operating state. Based upon the analysis of the state change indication, the automation manager can determine if the change in the operating state is deliberate. When the change is determined to be deliberate, the automation manager can accept the change in the operating state as the desired state of the software resource.

12 Claims, 2 Drawing Sheets

RESOLVING CONFLICTS BETWEEN MULTIPLE AUTOMATION MANAGERS IN THE MANAGEMENT OF SOFTWARE RESOURCES USING INTENTION FLAGS

BACKGROUND OF THE INVENTION

The present invention relates to the field of computing resource management, and, more particularly, to resolving conflicts in the management of software resources that are handled by multiple automation managers.

Information technology (IT) systems often employ a variety of automation managers to automate the handling of the system's vast quantity of resources. Many times multiple automation managers oversee a common resource. Conflicts often occur when multiple automation managers are involved with the same resource. This can be true for a software resource of stand-alone computing system and even more so for more complex systems, such as distributed computing environment, autonomic environments, clustered computing environments, virtual computing environments, and the like.

For example, a high-availability automation manager can be configured to check the availability of an application (e.g., software resource) and to triggers recovery actions when an error occurs. A performance manager can monitor the application's performance data and can dynamically adjust application usage based on performance objectives. A provisioning manager can dynamically change systems able to interact with software resources and/or a set of software resources available to interact with. When one automation manager (such as the performance manager) decides to stop an execution of the application, another manager (e.g., a fault recovery one) can detect a "failure" of the software resource and initialize actions to restart that resource. In a worse case, a computing environment can repetitively thrash between two states, as one automation manager is attempting to halt, disable, or stop a resource and another is attempting to ensure the software resource is available.

Many current approaches to resolve these automation manager induced conflicts rely upon peer-to-peer communications between the multiple automation managers, which is not widely supported by many computing systems or environment. Further, communications among automation managers can be difficult in many distributed contexts due to security considerations, such as when these automated managers are positioned on different sides of a security firewall. Other approaches require manual intervention by a user or administrator to resolve conflicts. For example, a user many be required to manually disable (permanently or temporarily) one or more automated automation managers to prevent conflicts. Another approach attempts to establish complex priority rules and situational conditions, which determine which automation manager is to control a software resource is a conflict situation. These priority-based systems can be difficult to administer and adjust, can be resource intensive, and can result in performance delays.

SUMMARY OF THE INVENTION

A solution comprising a method, computer program product, and system for resolving conflicts between multiple automation managers. A value of an intention indicator can be maintained for an associated software resource. The maintained value for the intention indicator can indicate whether a last successfully performed deliberate programmatic action involving the software resource intentionally disabled the software resource. An intrinsic state can be determined for the software resource that indicates that the software resource is disabled. A value of the intention indicator associated with the software resource can be checked. When the checked value indicates that the software resource was not intentionally disabled, an occurrence of a fault condition involving the software resource can be assumed and at least one corrective action to reenabled the software resource can be performed. When the checked value indicates that the software resource was intentionally disabled, it can be assumed that no fault condition occurred involving the software resource and no corrective action to re-enable the software resource can be performed. The software resource can be a resource able to be utilized by a set of automation managers running in a computing environment. At least one of the automation managers can be configured to perform recovery actions for failed software objects. At least one other automation manager can be configured to intentionally and temporarily disable the software object. The intention indicator can be configured to prevent conflicts between the automated software managers without utilizing communications between the automated software managers. The programmatic actions involving the software resource can be performed independently and concurrently by a set of automation managers, where each automation manager is configured to alter the operating state of the software resource. The software resource can include a software application, a network component, an operating system, a database, a file system, a network service, and/or a peripheral device of a component of the computing system.

When the solution is implemented within a computer program product, the computer program product can include a computer usable medium having computer usable program code embodied therewith. The computer usable program code can be configured to cause a machine to perform each of the actions of the solution in accordance with programmatic instructions of the computer usable program code.

When the solution is implemented within a system, the system can include a bus, a memory connected to the bus, and a processor. The memory can be configured to contain a set of instructions. The processor can be connected to the bus. The processor can be operable to execute the instructions of the memory, which results in the processor performing each of the actions of the solution.

Another aspect of the present invention can include automated method for resolving conflicts between multiple automation managers in the management of a software resource. A change in an operating state of a software resource can be detected within a computing environment by an automation manager. A state change indication for the software resource can be automatically analyzed. The state change indication can be automatically set in response to the change in the operating state. Based upon the analysis of the state change indication, a deliberateness of the change in the operating state can be determined. When the change is determined to be deliberate, the change in the operating state can be accepted as a desired state of the software resource.

Another aspect of the present invention can include a system for resolving conflicts between multiple automation managers in the management of a software resource. The system can include a software resource and a set of automation managers. The software resource can set a state change indication upon an occurrence of a change in an operating state. The state change indication can represent a deliberateness of the change in the operating state for the software resource. The set of automation managers can independently and concurrently manage the operating state of the software resource. The automation managers can utilize the state change indication to influence actions taken in the management of the operating state of the software resource.

BRIEF DESCRIPTION OF THE SEVERAL VIEWS OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
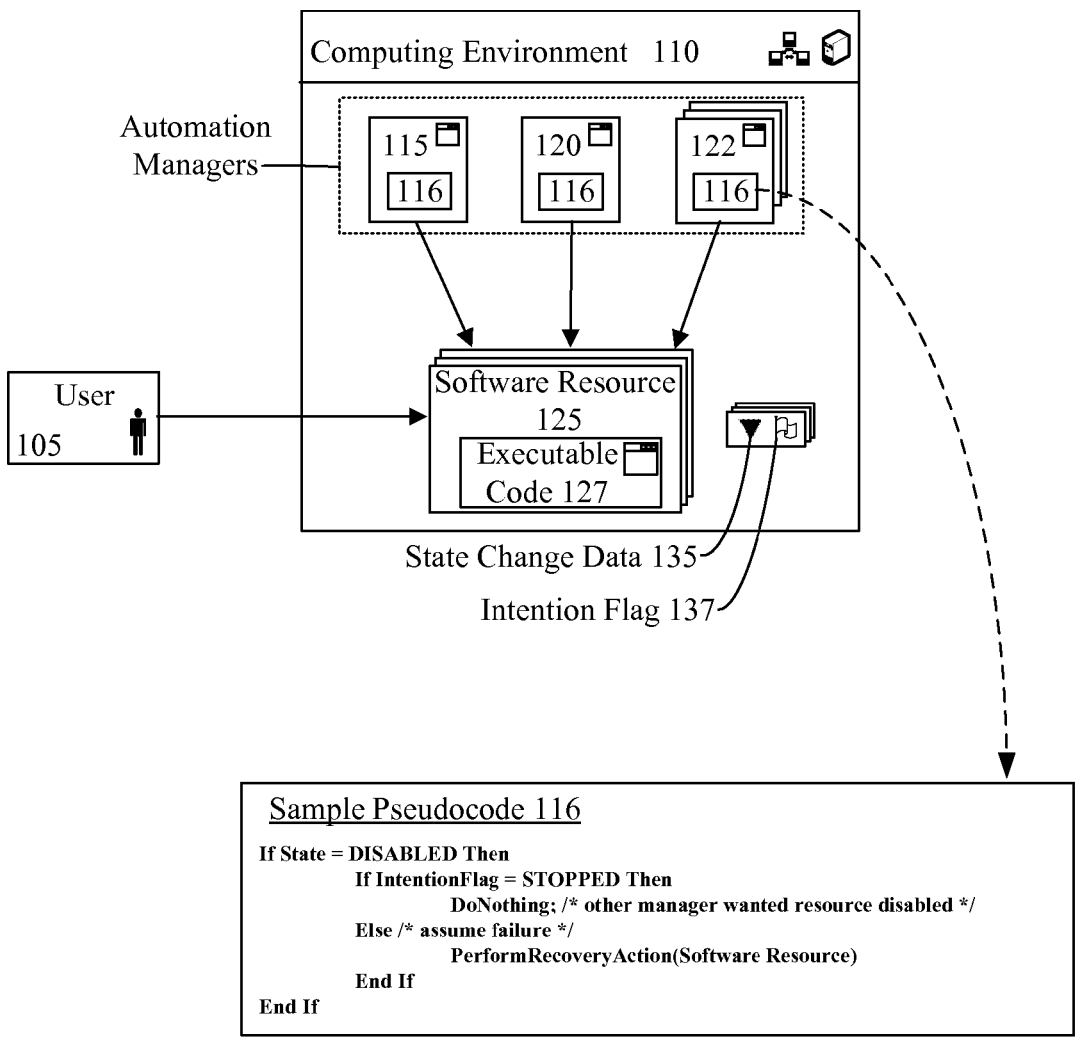
FIG. 1 is a schematic diagram illustrating a technique for resolving conflicts between multiple automation managers in the management of a software resource in accordance with an embodiment of the inventive arrangements disclosed herein.

The present invention discloses a solution that can resolve conflicts between multiple automation managers during the management of software resources. An automation manager can be an automation component (e.g., executing software application) able to change a state of a software resource to which other automation managers and/or users have access. The software resource can have two or more states, such as an enabled state and a disabled state. The state of the software resource can be determined by an automation manager. For example, the automation manager can receive a list of running programs from a runtime environment and can check if a particular program is listed to determine if that program is active. Other state checks can also be performed, such as determining a state of a Web server by checking whether an HTTP port is open. An intention flag associated with the resource can indicates whether the current state was explicitly or intentionally set by an automation manager or user or whether the current state resulted from an implicit situation, such as an occurrence of a fault condition. Automation managers with access to the software resource can read the intention flag, and can perform suitable programmatic actions based upon a value of this flag.

For example, when the intention flag indicates that a software resource was intentionally placed in a disabled state, recovery from error actions can be bypassed. When the intention flag indicates that the resource is disabled due to a fault, however, an automated manager can perform recovery actions involving the software resource. The use of the intention flag varies from prior art, which attempts to explicitly determine the state in various ways. These techniques are inferior to inferential state determinations based upon the intention flag value for situations involving faults, as by nature faults can cause explicitly maintained state information to be incorrect. That is, when a fault condition occurs, explicitly maintained state information for a resource may not be correctly updated, which is especially true when intra resource metadata is used to preserve state. This is not a problem when intention flags are used, since the value for the flag from which a correct resource state can be inferred is established prior to an occurrence of the fault condition.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Any suitable computer usable or computer readable medium may be utilized. The computer-usable or computer-readable medium may be, for example but not limited to, an electronic, magnetic, optical, electromagnetic, infrared, or semiconductor system, an apparatus, or a device. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk—read only memory (CD-ROM), compact disk—read/write (CD-R/W) and DVD.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram 100 illustrating a solution for resolving conflicts between multiple automation managers 115-122 in the management of a software resource 125 in accordance with embodiments of the inventive arrangements disclosed herein. In diagram 100, multiple entities (105, 115-122) can be able to change a state of a software resource 125 used in computing environment 1 10. Changing the state of resource 125 can include enabling and disabling the resource 125. Enabling a resource 125 can include creating an active instance of the software resource 125 as well as adjusting a property of the resource 125 so that it can be utilized in environment 1 10. Disabling a resource 125 can terminate a previously active instance of a resource 125 as well as adjusting a property of the resource 125 so that it cannot be utilized in environment 110 (at least until the state of the resource 125 is changed from a disabled state). The operating state of a resource 125 refers to a current intrinsic state of the resource 125. An intention flag 137 can be associated with each resource 125 which indicates the last intended state change to the resource 125. The intention flag 137 is accessible by the automation managers 115-122 independent of the availability or lifecycle of the resource 125. The managers 115-122 can infer a correct resource state (even when a fault condition has occurred that affects resource 125) using a current intrinsic state and comparing it with the intended state reflected by the value of the intention flag 137.

Hence, potential conflicts between a discernable "current state" of a resource 125 and an actual resource 125 state are resolved by maintaining an intention flag 137 for each software resource 125. More specifically, the intention flag 137 can indicate whether a current state of the resource 125 was intentionally set by a user 105 or automation manager 115-122. The automated managers 115-122, the software resource 125 and/or other programmatic component can change the intention flag 137, whenever the managers 115-122 change a state of the software resource 125. When the operating state of a resource 125 is active, the flag 137 can be automatically set to intentional (or can be presumed to be intentional within programmatic logic) since a resource 125 may never become available without intention. This assumption can be implementation specific. For example, in a pool of shared software resources 125, an active state may just indicate that memory has been allocated for the software object 125, while an available state (different from the available state) can indicate that the software object 125 is available for use. Depending upon implementation, any number of two or more states can be ascertained for the software resource 125. Thus, the intention flag 137 can be implemented as either a BOOLEAN value, when only two states are maintained, or as other types of values (e.g., INTEGER, CHARACTER, STRING, etc.) when changes among different states are indicated by the flag 137.

One or more of the automation managers 115-122 can be configured to include code 116 that situationally checks the intention flag 137 before performing actions involving the software resource 125. This check can permit the automation managers 115-122 to only perform actions suitable for the intention 137 and the current state of the resource 125. For example, automation managers 115-122 will perform fault recovery actions involving resource 125 only when the state of the resource is disabled and when the intention flag 137 shows that no other manager 115-122 or user 105 intentionally disabled the resource 125.

For example, sample pseudo-code 116 shows that a manager 115-122 can perform a recovery action for the software resource 125 when the state is disabled but the intention flag 137 shows that the last intended action was not to stop and disable the resource. For example, an automation manager 115-122 can set the intention flag to STARTED when the software resource 125 has been enabled. Later, the automation manager checks the state of the resource and determines that it has become disabled. Before doing any recovery actions it checks the intention flag 137. If the intention flag is STOPPED it is obvious that another manager has stopped the resource; nothing is done; a recovery action would be inappropriate. However, if the state is still STARTED it can be assumed that a failure has occurred and a recovery action is to be performed. Sample pseudo-code 116 is provided for illustrative purposes only and is not intended to be utilized as a constraint upon the inventive scope of system 100.

In one embodiment of system 100, additional state change data 135 can exist, which can contain a variety of information concerning the resource 125 and resource state 135. For example, the state change data 135 can include a time stamp of when the state of the resource 125 last changed. When managers 115-122 explicitly or intentionally disable (setting flag 137 according) a resource, a maximum disablement time can be established. Thus, a manager 115 responsible for fault recovery can institute a recovery action for a disabled resource 125, even when the disablement was intentional (as determined from flag 137) should the maximum disablement time be exceeded. Thus, use of data 135 can prevent problems when a manager 115-122 fails to explicitly change the intention flag 137 back to active for any reason, such as a software error or fault condition specific to a responsible manager 115-122 (which is an alternative means to resolve this possible problem to that shown in the latter part of sample pseudo-code 11 6).

The state change data 135, when present in an implementation of system 100, can include any of a variety of data elements, such as data that tracks or logs actions performed against the resource 125, by which managers 115-122 at which times, which can be used should an optional priority scheme be implement for the resource 125 for which different managers 115-122 have higher priority considerations than other managers 115-122. A few of these data elements can include a process identifier, a program name (identifier of manager 115-122), text, and the like. The text can include a human and/or machine readable log of actions against the resource 125, such as "resource disabled by operator XYZ."

The software resource 125 can include executable code 127. When in an active state, the code 127 can be executed responsive to a user 105 action or a request of one of the automation managers 115-122. For example, the code 127 can be an executable of a Web service. During user 105 interactions, code 127 can adjust the operating state of the resource 125, which results in corresponding changes to the intention flag 137 and/or the optional state change data 135.

As used herein, a software resource 125 can be any software object able to be utilized by one or more automation managers 115-122 and/or a user 105. For example, a software resource 125 can include an application, a Web service, a service oriented architecture (SOA) software component, a set of one or more software routines, a driver controlling a hardware resource, and the like.

Intention flag 137 and additional state change data 135 can be structured, encoded data that describes one or more characteristics of software resources 125 to aid in the identification, discovery, assessment, and management of the resource 125. In one embodiment, the flag 137 and the state change data 135 can be stored as digitally encoded information within a portion of the resource 125 itself, but it must be ensured that they are accessible independent of the state of the resource 125 since the data 135, 137 must be available during fault conditions when the software resource 125 itself may be inaccessible or non-existent. In another embodiment, the flag 137 and the state change data 135 can be stored in a separate file or data object that is associated or related to the software resource 125. In another embodiment the flag 137 and the state change data 135 of all software resources 125 running in computing environment 110 are stored in a central location of computing environment 110.

An automation manager 115-122 can include a set of programmatic instructions able to access functionality of resource 125 and to change a state of the software resource 125. Automation managers 115-122 can include, but are not limited to, fault recovery managers, performance managers, provisioning managers, and the like.

A computing environment 110 can include any environment comprising hardware, software, and firmware resources where programmatic actions are able to be executed by a set of one or more machines. In different implementations, the computing environment 110 can be a stand-alone environment, a distributed computing environment, a virtualized computing environment, a simulated computing environment, an autonomic computing environment, an environment conforming to a SOA, a collaborative Web computing environment, and the like.

It is important to note that the approach of the present invention is independent of the operating system running on the server 110 and the type of software resource 125. It should also be emphasized that the current invention does not require communication or awareness between the software resource management entities 105, 115, and/or 120, as required by conventional systems for resolving such conflicts.

Figure 2:
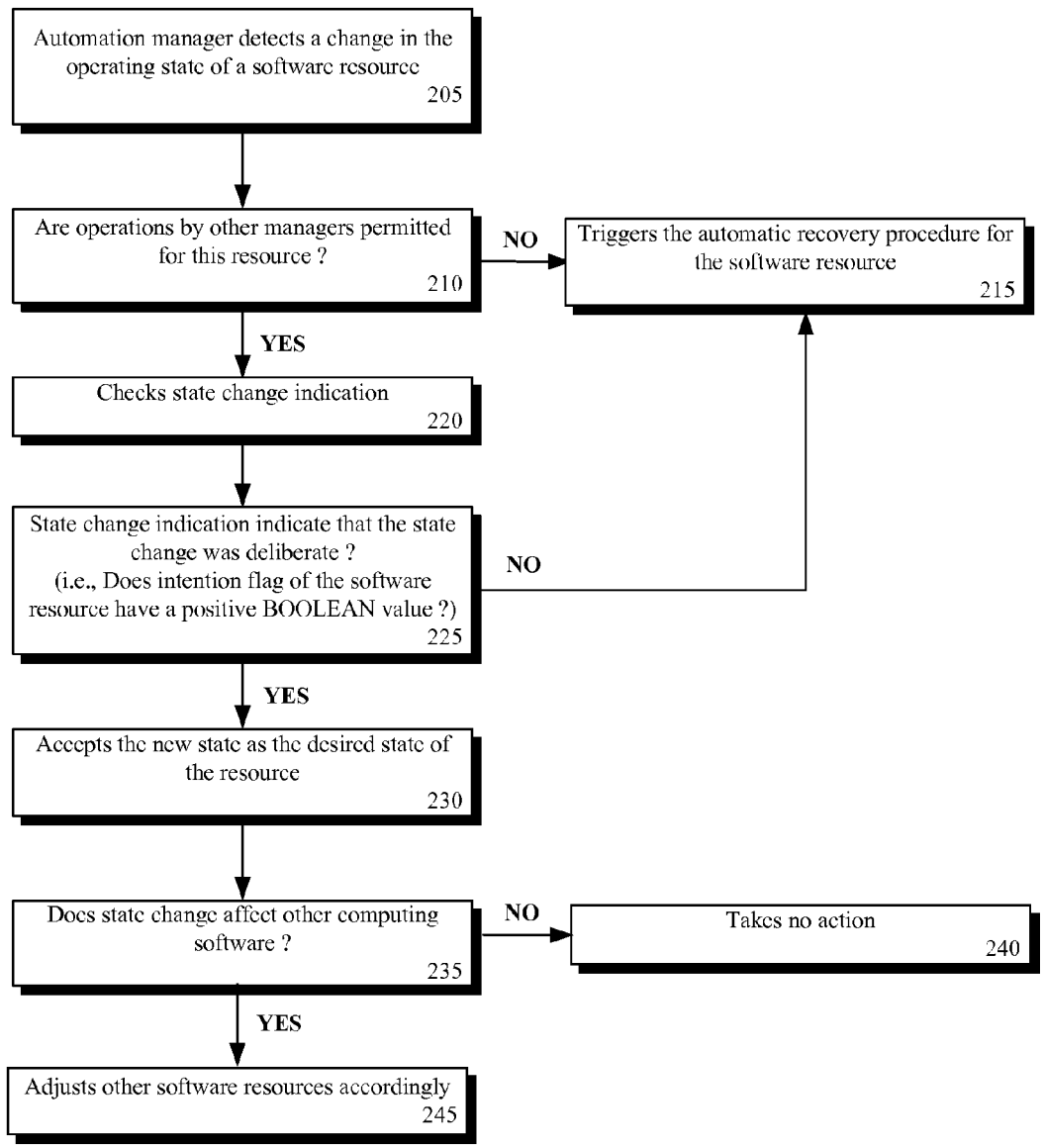
FIG. 2 is a flow chart of a method for resolving conflicts between multiple automation managers in the management of a software resource in accordance with an embodiment of the inventive arrangements disclosed herein.

FIG. 2 is a flow chart of a method 200 for resolving conflicts between multiple automation managers in the management of a software resource in accordance with an embodiment of the inventive arrangements disclosed herein. Method 200 can be performed in the context of system 100 or any other system supporting the use of a state change indication to resolve conflicts between multiple automation managers.

Method 200 can begin in step 205 where an automation manager can detect a change in the operating state of a software resource. In step 210, the automation manager checks whether operations by other automation managers are permitted on this resource and should be accepted. If such operations are not permitted (e.g. because the resource is so critical that a state change is not acceptable and this automation manager has been assigned the primary responsibility for this resource) the automation manager can invoke step 215 immediately without inspecting the state change intention flag. In step 215, the automation manager can trigger the automatic recovery procedure for the software resource to bring it back to the desired state.

When it is determined that the state change could have been caused by an external operation and such actions are permitted and therefore should be accepted, then the automation manager can check the state change indication in step 220. In step 225, the automation manager can use the state change indication to determine if the state change was deliberate. For example, when intention flags are used for maintaining intention of a current operating state, the flag's value can be examined.

When it is determined that the state change is not deliberate, then flow can diverge to step 215 and the triggering of the automatic recovery procedure. When it is determined that the state change is deliberate, then step 230 can execute where the automation manager can accept the new state as the desired state of the software resource.

In step 235, the automation manager can determine if the state change affects other software resources, such as other software resources that are dependently-related. When no other software resources are affected, then step 240 can execute where the software resource need not take any actions. When other software resources are affected, then the automation manager can adjust the other software resources accordingly in step 245.

The diagrams in FIGS. 1-2 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for resolving conflicts between multiple automation managers comprising:

maintaining a value of an intention indicator for an associated software resource, wherein the maintained value for the intention indicator indicates whether a last successfully performed deliberate programmatic action involving the software resource intentionally disabled the software resource;

determining that an intrinsic state of the software resource indicates that the software resource is disabled;

checking a value of the intention indicator associated with the software resource;

when the checked value indicates that the software resource was not intentionally disabled, assuming an occurrence of a fault condition involving the software resource and performing at least one corrective action to re-enable the software resource.

2. The method of claim 1, wherein the software resource a resource able to be utilized by a plurality of automation managers running in a computing environment.

3. The method of claim 2, wherein at least one of the automation managers is configured to perform recovery actions for failed software objects, and wherein at least one other automation manager is configured to intentionally and temporarily disable the software object.

4. The method of claim 3, wherein the intention indicator is configured to prevent conflicts between said automated software managers without utilizing communications between the automated software managers.

5. The method of claim 1, wherein programmatic actions involving the software resource are performed independently and concurrently by a plurality of automation managers, wherein each automation manager is configured to alter the operating state of the software resource.

6. The method of claim 1, wherein the software resource comprises at least one of a software application, a network component, an operating system, a database, a file system, a network service, and a peripheral device of a component of the computing system.

7. A computer program product for resolving conflicts between multiple automation managers, the computer program product comprising:

a computer readable storage medium having computer usable program code embodied therewith, the computer usable program code comprising:

computer usable program code configured to maintain a value of an intention indicator for an associated software resource, wherein the maintained value for the intention indicator indicates whether a last successfully performed deliberate programmatic action involving the software resource intentionally disabled the software resource;

computer usable program code configured to determine that an intrinsic state of the software resource indicates that the software resource is disabled;

computer usable program code configured to check a value of the intention indicator associated with the software resource;

computer usable program code configured to assume an occurrence of a fault condition involving the software resource and performing at least one corrective action to re-enable the software resource when the checked value indicates that the software resource was not intentionally disabled.

8. The computer program product of claim 7, wherein the software resource a resource able to be utilized by a plurality of automation managers running in a computing environment.

9. The computer program product of claim 8, wherein at least one of the automation managers is configured to perform recovery actions for failed software objects, and wherein at least one other automation manager is configured to intentionally and temporarily disable the software object.

10. The computer program product of claim 9, wherein the intention indicator is configured to prevent conflicts between said automated software managers without utilizing communications between the automated software managers.

11. The computer program product of claim 7, wherein programmatic actions involving the software resource are performed independently and concurrently by a plurality of automation managers, wherein each automation manager is configured to alter the operating state of the software resource.

12. The computer program product of claim 7, wherein the software resource comprises at least one of a software application, a network component, an operating system, a database, a file system, a network service, and a peripheral device of a component of the computing system.

* * * * *